(12) United States Patent
Hill et al.

(10) Patent No.: US 6,379,833 B1
(45) Date of Patent: Apr. 30, 2002

(54) ALTERNATIVE ELECTRODE SUPPORTS AND GAS DISTRIBUTORS FOR MOLTEN CARBONATE FUEL CELL APPLICATIONS

(75) Inventors: Andy H. Hill, Glen Ellyn; Chakravarthy Sishtla, Woodridge; Leonard G. Marianowski, Mount Prospect, all of IL (US)

(73) Assignee: Institute of Gas Technology, Des Plaines, IL (US)

( * ) Notice: Subject to any disclaimer, the term of this patent is extended or adjusted under 35 U.S.C. 154(b) by 0 days.

(21) Appl. No.: 09/130,763

(22) Filed: Aug. 7, 1998

(51) Int. Cl.⁷ .................. H01M 4/86; H01M 8/04; H01M 8/14
(52) U.S. Cl. .................. 429/34; 429/16; 429/44
(58) Field of Search .................. 429/16, 34, 38, 429/39, 40, 41, 44, 45

(56) References Cited

U.S. PATENT DOCUMENTS

| | | |
|---|---|---|
| 3,516,867 A | 6/1970 | Dankese |
| 3,615,845 A | 10/1971 | Gray |
| 4,035,551 A * | 7/1977 | Grevstad ............... 429/44 |
| 4,206,271 A | 6/1980 | Norling et al. ............ 429/45 |
| 4,404,267 A | 9/1983 | Iacovangelo et al. ...... 429/41 |
| 4,423,122 A | 12/1983 | Iacovangelo et al. ...... 429/45 |
| 4,448,857 A | 5/1984 | Iacovangelo ............. 429/41 |
| 4,507,262 A | 3/1985 | Karas et al. ............. 419/2 |
| 4,756,981 A * | 7/1988 | Breault et al. ........... 429/36 |
| 4,963,442 A | 10/1990 | Marianowski et al. ...... 429/13 |
| 5,240,665 A | 8/1993 | Seo et al. ............... 264/169 |
| 5,362,578 A | 11/1994 | Petri et al. ............. 429/35 |
| 5,518,840 A | 5/1996 | Verhoog et al. .......... 429/211 |
| 5,558,948 A | 9/1996 | Doyon ................... 429/40 |
| 5,563,003 A | 10/1996 | Suzuki et al. ........... 429/14 |
| 5,641,586 A | 6/1997 | Wilson .................. 429/30 |
| H16 H | 1/1986 | Kaun .................... 429/29 |

FOREIGN PATENT DOCUMENTS

| | | |
|---|---|---|
| EP | 0 689 258 A1 | 12/1995 |
| JP | 58131664 | 8/1983 |
| JP | 59096668 | 6/1984 |
| JP | 60059673 | 4/1985 |
| JP | 60154466 | 8/1985 |
| JP | 61271754 | 12/1986 |
| JP | 61277169 | 12/1986 |
| JP | 61-279067 | * 12/1986 |
| JP | 61279070 | 12/1986 |
| JP | 62076261 | 4/1987 |
| JP | 62295357 | 12/1987 |
| JP | 63086363 | 4/1988 |
| JP | 01231273 | 9/1989 |
| JP | 02100271 | 4/1990 |

* cited by examiner

*Primary Examiner*—Gabrielle Brouillette
*Assistant Examiner*—Jonathan Crepeau
(74) *Attorney, Agent, or Firm*—Pauley Petersen Kinne & Fejer (57) ABSTRACT

A molten carbonate fuel cell having an anode electrode, a cathode electrode, and an electrolyte matrix disposed between the anode electrode and the cathode electrode. An electrode support constructed of a high porosity reticulated foam material is disposed on an anode electrode face of at least one of the anode electrode and the cathode electrode facing away from the electrolyte matrix and forming a plurality of pores. An electrolyte is disposed within at least a portion of the plurality of pores, whereby at least a portion of the electrolyte flows into the electrolyte matrix during initial conditioning of the fuel cell.

13 Claims, 10 Drawing Sheets

FIG. 1

GAS FLOW (ΔP~0.2-in. W.C.)

ALTERNATIVE ELECTRODE SUPPORTS AND GAS DISTRIBUTORS FOR MOLTEN CARBONATE FUEL CELL APPLICATIONS

BACKGROUND OF THE INVENTION

1. Field of the Invention

This invention relates to alternative electrode supports and gas distributors for use in molten carbonate fuel cells which are designed to replace the expensive state-of-the-art electrode support components and allow for replacement of expensive ribbed separator plates currently in use in molten carbonate fuel cell stacks with inexpensive flat plates.

2. Description of Prior Art

Molten carbonate fuel cells have the potential for greatly decreasing the cost of generating electricity. In a typical application, a plurality of individual fuel cell units, separated by bi-polar electronically conductive separator plates, are stacked together and secured into a single stage unit to achieve a desired fuel cell energy output. Each individual cell generally includes an anode electrode, a cathode electrode, an electrolyte disposed between the anode electrode and the cathode electrode, and a fuel and oxidant gas source. Both fuel and oxidant gases are introduced through manifolds, either internal or external to the fuel cell stack, to the respective reactant regions thereof.

However, molten carbonate fuel cell stacks contain a variety of components that are inherently expensive in terms of both material and fabrication costs which greatly increase the overall cost of manufacturing molten carbonate fuel cell power plants and, therefore, the cost of electricity. One of the highest cost elements in a molten carbonate fuel cell stack is represented by the state-of-the-art perforated nickel plate used as an anode support and current collector. It is estimated that elimination of the anode support and current collector alone would significantly reduce material costs by $366 per kilowatt. Elimination of the state-of-the-art perforated stainless steel plate used as a cathode current collector would further reduce material costs.

In conventional molten carbonate fuel cell stacks, in addition to separating adjacent fuel cell units from one another, the separator plate is used to distribute reactant gases to the respective anode and cathode electrodes. To accomplish this distribution task, the separator plates are frequently patterned, such as by ribs or corrugations, so as to form channels through which the reactant gases flow for distribution to the respective electrodes. Such a separator plate is taught, for example, by U.S. Pat. No. 4,963,442 and U.S. Pat. No. 5,362,578. However, these stateof-the-art separator plates are also very expensive to produce.

One solution to these problems is the use of an electrode support in place of expensive and heavy state-of-the-art perforated nickel and stainless steel support plates/current collectors. U.S. Statutory Invention Registration H 16 to Kaun teaches a fuel cell having an anode, a gas impermeable matrix containing electrolyte, and a cathode. These three principal components are arranged in a stack and separated from adjacent fuel cells by gas impermeable electrically conductive separator plates. The electrodes comprise porous plaque support structures, each with an impregnated layer of catalyst material disposed in an inward, major surface section adjacent to the electrolyte matrix. The outward sections of the porous plaques are substantially free of catalysts, thereby enabling the admission and discharge of reactant gases.

It is also known to store a portion of the electrolyte required to operate a molten carbonate fuel cell in one or both of the electrodes whereby during initial heat-up/conditioning of the fuel cell, the electrolyte in the electrodes melts and flows into the electrolyte matrix disposed between the electrodes. However, it is desirable to use as thin electrodes as possible in a fuel cell to minimize the distances required for carbonate ions to travel during operation of the fuel cell. As a result, the electrodes are unable to store a sufficient amount of electrolyte to completely fill the electrolyte matrix.

Yet another problem with conventional fuel cell stacks is the shrinkage of the stack which occurs during initial heat-up resulting from the melting of carbonate tapes utilized to provide electrolyte to the electrolyte matrix. This is particularly problematic with larger fuel cell stacks. Accordingly, it is desired to provide a means for supplying electrolyte to the electrolyte matrix in a manner which overcomes the problems arising from shrinkage of the fuel cell stack during initial heat-up/conditioning.

SUMMARY OF THE INVENTION

Accordingly, it is one object of this invention to provide an electrode support for a molten carbonate fuel cell which eliminates the requirement of conventional fuel cell stack systems for expensive ribbed or corrugated separator plates.

It is another object of this invention to provide an electrode support for a molten carbonate fuel cell which provides the function of reactant gas distribution to the respective electrodes.

It is another object of this invention to provide an electrode support for a molten carbonate fuel cell which eliminates the highest cost elements in a molten carbonate fuel cell stack, namely the state-of-the-art perforated nickel plate used as an anode support and current collector and the state-of-the-art perforated stainless steel plate used as a cathode current collector.

It is yet another object of this invention to provide an electrode support for a molten carbonate fuel cell which is capable of supplying electrolyte to the electrolyte matrix of the fuel cell during initial heat-up/conditioning of the fuel cell.

These and other objects of this invention are achieved in a molten carbonate fuel cell comprising an anode electrode, a cathode electrode, and an electrolyte matrix disposed between the anode electrode and cathode electrode by an electrode support in accordance with one embodiment of this invention constructed of a high porosity reticulated foam material disposed on an electrode face (side) of the anode electrode and/or the cathode electrode facing away from the electrolyte matrix and forming a plurality of pores. An electrolyte is disposed within at least a portion of the plurality of pores, as a result of which at least a portion of the electrolyte flows into the electrolyte matrix during initial conditioning of the fuel cell.

The electrode support of this invention is an inexpensive, lightweight, and durable alternative to the current state-of-the-art expensive and heavy perforated nickel and stainless steel support plates/current collectors. Because the electrode supports of this invention are fabricated from highly porous, or very thin materials, they weigh only about 6% to about 25% of the weight of state-of-the-art anode and cathode current collectors. The electrode supports of this invention may be configured either as thin plates or as corrugated structures. We have found that regardless of which configuration is employed, the electrode supports of this invention are able to withstand the compressive forces encountered in a typical molten carbonate fuel cell. In addition, because each of the electrode supports also act as very low pressure drop gas distributors, it is possible to replace the expensive state-of-the-art ribbed separator plates with much cheaper, flat sheet metal plates, thereby substantially reducing overall fuel cell fabrication costs. The electrode supports of this invention are constructed in accordance with a particularly preferred embodiment of this invention from high porosity reticulated foam materials, and in accordance with other embodiments from corrugated supports made from thin perforated or expanded metal foils, and slotted metals.

BRIEF DESCRIPTION OF THE DRAWINGS

These and other objects and features of this invention will be better understood from the following detailed description taken in conjunction with the drawings wherein.

DESCRIPTION OF PREFERRED EMBODIMENTS

Figure 1:
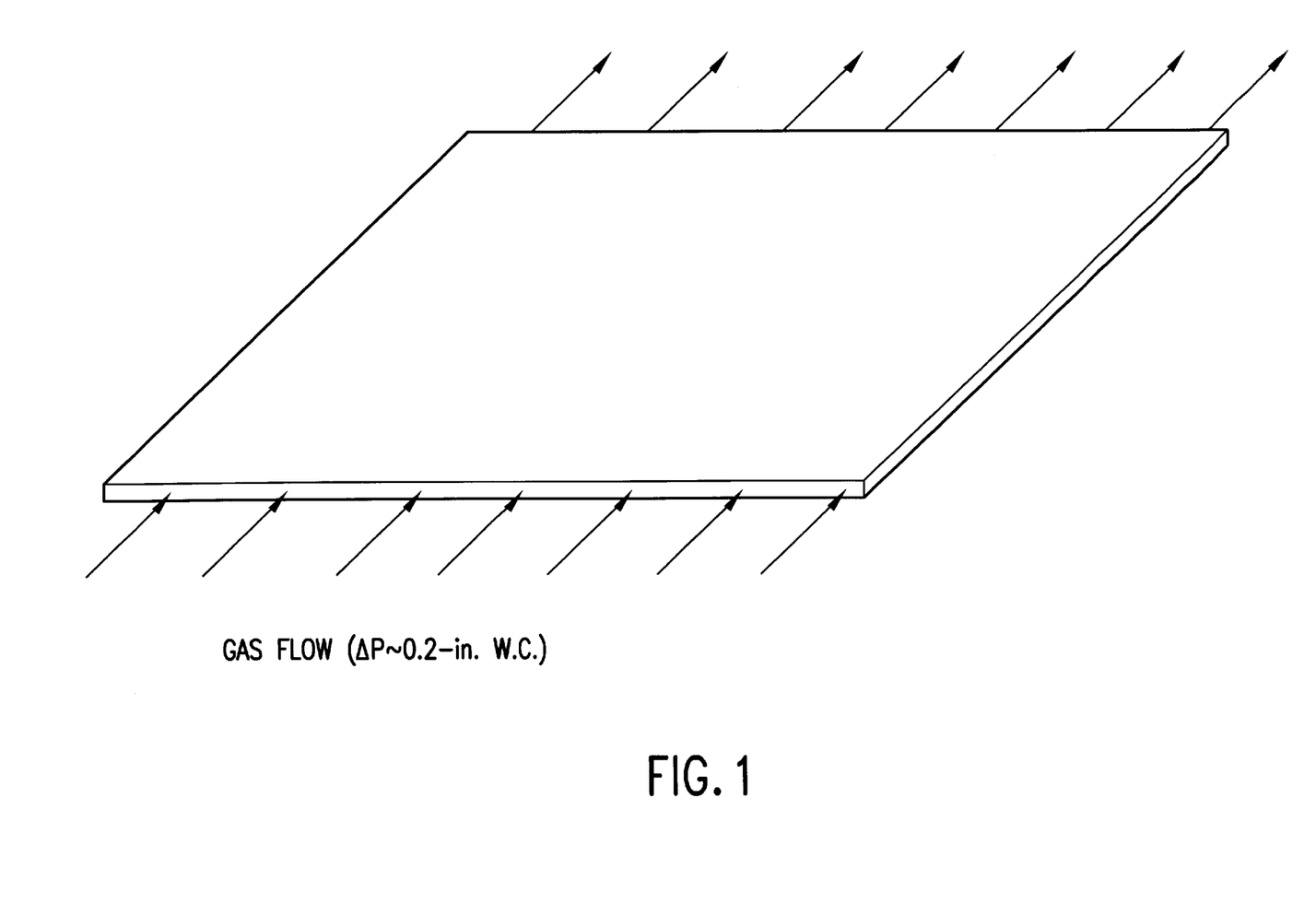
FIG. 1 is a diagram of a porous foamed metal electrode support and gas distributor in accordance with one embodiment of this invention.

FIG. 1 shows a pictorial representation of a porous foamed metal electrode support/gas distributor for a molten carbonate fuel cell in accordance with one embodiment of this invention. These porous materials are fully sintered open cell reticulated/foam-like structures. These materials are fabricated from reticulated/interconnected web precursors to which a metal or ceramic coating is applied. During a thermal process, the precursor is removed and the coating sintered, leaving behind a rigid structure. The metal or ceramic foam material is preferably about 3% to about 85% dense (about 97% to about 15% porous) and is extremely lightweight. It is typically about $\frac{1}{10}$ to about $\frac{1}{20}$ the weight of a piece of sheet metal and it has a very high surface area when compared to that of the same sized non-porous shape, about 1500 times the surface area.

The high porosity reticulated foam material of the electrode supports of this invention are typically nickel or Type 316 stainless steel. However, other metals or combinations of metals in various proportions may also be used to fabricate these foamed metal structures. In accordance with one preferred embodiment of this invention, the high porosity reticulated foam material is fabricated from a reticulated/interconnected web precursor coated with one of a metal and a ceramic material which is heated to remove the reticulated/interconnected web precursor.

In accordance with another embodiment of this invention, the high porosity reticulated foam material comprises one of a metal and a metal alloy selected from the group consisting of nickel, Type 316 stainless steel, Type 304 stainless steel, Type 316Ti stainless steel, nickel-chromium, nickel-aluminum, copper and mixtures thereof. In accordance with another embodiment of this invention, the high porosity reticulated foam material is constructed of at least one superalloy such as HASTELLOY-X and HASTELLOY C-22 from Haynes International, Kokomo, Indiana and INCOLLOY 718 and INCOLLOY 625 from INCO Alloys International, Huntington, W. Va.

The porous foamed metal electrode support shown in FIG. 1 is a flat plate or slab. However, it will be apparent to those skilled in the art that any size or shape desired within the limits of the foamed metal fabrication process may be employed. The porous foamed metal materials utilized to produce the electrode supports of this invention can be tailored to any design including the fabrication of density gradients within the porous body to create, for example, internal manifolding (interdigitated flow) and to promote even gas distribution over the adjacent electrode in a fuel cell, or to prevent gas from flowing out of the cell, thereby acting as a gas barrier. The densified section of the porous body can also act as a diffusion barrier to prevent migration of unwanted components and/or enhance migration of desired components. Different configurations can also be obtained by diffusion bonding the porous bodies to each other or to other structures. This, in turn, will also enhance electrical conductivity. In accordance with one preferred embodiment of this invention, the porous foamed electrode supports comprise a catalyst material disposed on the high porosity reticulated foam material. The catalyst material is of a type suitable for promoting direct internal reforming of a fuel within the fuel cell. Conventional direct internal reforming in molten carbonate fuel cells is accomplished by spreading the reforming catalyst in the channels between the ribs of a ribbed separator plate. Using the porous foamed electrode supports of this invention as catalysts and/or catalyst substrates increases heat transfer, decreases pressure drop, increases methane conversion, and generally improves system efficiency. Suitable catalytic materials include elements such as Ni, Mg, Al, Ce, Li, Zr, Pt, Pd, Rh and other metals and metal compounds suitable for catalyzing reactions useful in molten carbonate fuel cells such as hydrocarbon reforming reactions in both direct and indirect internal reforming. In accordance with one embodiment of this invention, the catalyst is applied non-uniformly to the porous metal foam so that less (or more) catalytic activity is obtained depending on the amount of catalyst applied and the desired reactivity.

In certain cases, to increase the compressive, shear and tensile strength of the porous foamed electrode supports, it may be desirable to further strengthen the porous metal foams. In accordance with one embodiment of this invention, the porous metal foams are fabricated from oxide-dispersion-strengthened alloys. Particularly preferred are alloys of Ni, Al, Cr, Ti and W.

In accordance with another embodime nt of this invention, solid metal wires or strips of metal or ceramic fibers are implanted into the porous metal foam during fabrication. This type of structure prevents the cells that make up the porous metal foam structure from collapsing. The thickness of the wires can be selected to act as spacers for retention of individual cell dimensions.

In accordance with yet another embodiment of this invention, a slurry containing nickel or other metal powder is applied as narrow ribs, bands or small round areas onto the porous metal foam prior to its exposure to high temperature, thereby creating, selected areas (columnar or rib-like structures) of higher density metal providing structural compressive strength and similar effects to those resulting from the implantation of solid metal wires or metal strips as described hereinabove.

In accordance with one particularly preferred embodiment of this invention, stored within the porous metal foams comprising the electrode support/gas distributor of this invention is at least a portion of the carbonate electrolyte required for operation of the molten carbonate fuel cell. Electrolyte tapes are currently used in molten carbonate fuel cell stack technology to store the carbonate electrolyte required for impregnating the anode and cathode electrodes and the matrix of the fuel cell. However, in a molten carbonate fuel cell stack, as the stack is conditioned and the carbonate tapes melt, non-uniform stack shrinkage along with highly undesirable and uncontrollable stack shifting can occur. By storing the required carbonate electrolyte in the porous metal foam, the need for, and the problems associated with, the use of carbonate tapes in molten carbonate fuel cell stacks is eliminated. An additional benefit is that adequate carbonate can be stored in the metal foam, thereby assuring long-term operation of the stack without the need for external additions of carbonate during cell/stack operation. Although it is known to store electrolyte in the electrodes of a molten carbonate fuel cell, which electrolyte then wicks into the electrolyte matrix during heat-up of the fuel cell, the electrodes, due to their thinness, do not permit a sufficient amount of electrolyte to be stored for completely filling the electrolyte matrix. Thicker electrodes are undesirable for this purpose because they require larger distances for carbonate ions to travel during operation of the fuel cell.

Figure 4:
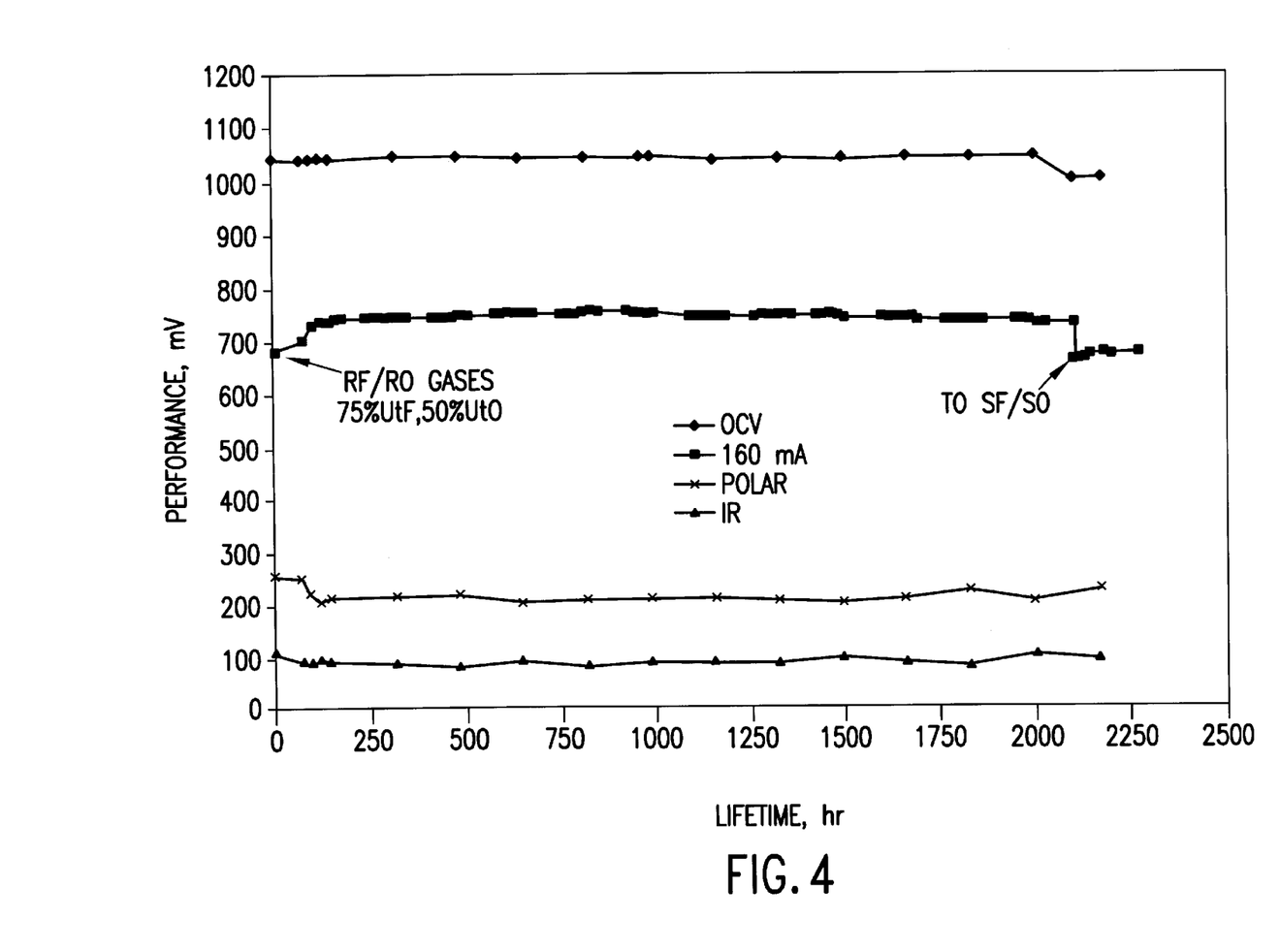
FIG. 4 is a diagram of a life plot of a molten carbonate fuel cell test using porous foamed metal anode electrode supports and gas distributors.

The application of porous foamed metal electrode supports in accordance with this invention was demonstrated in two bench-scale size molten carbonate fuel cells. Both cells were assembled using lithium/potassium carbonate electrolyte and a state-of-the-art matrix. They were operated primarily with a fuel gas containing (by volume) 60% hydrogen, 20% carbon dioxide, and 20% steam, and an oxidant gas containing 29% carbon dioxide, 68% air, and 2% steam, at 650° C. and atmospheric pressure. In the first cell, a 4-inch square, 0.133-inch thick section of 93% porous nickel foam metal was substituted for a flat perforated nickel sheet as an anode current collector and the ribs of the anode flange as gas distributor. A state-of-the-art stainless steel current collector and ribbed flange were used on the cathode side. As shown in FIG. 4, the fuel cell demonstrated state-of-the-art performance for a total of 2037 hours.

Figure 5:
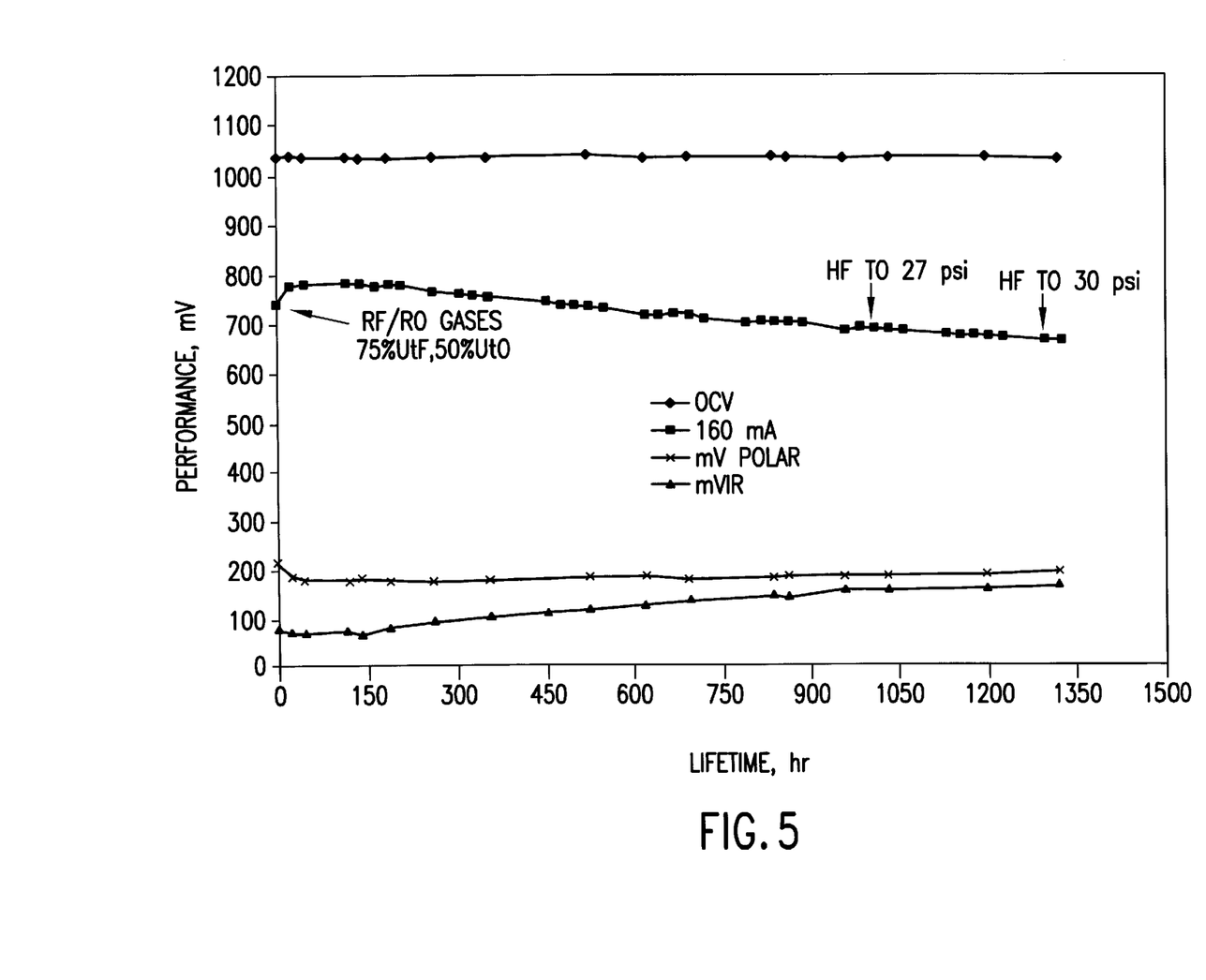
FIG. 5 is a diagram showing a life plot of a molten carbonate fuel cell test using porous foamed metal anode and cathode electrode supports and gas distributors.

In the second cell, two 4-inch square, 0.134-inch and 0.132-inch thick sections of 93% porous nickel and 93% porous Type 316 stainless steel foamed metal sheets were substituted for the flat perforated sheet nickel anode current collector and Type 316 stainless steel cathode current collector, respectively. The porous metal supports also replaced the ribs as gas distributors in both the anode and cathode flange. As shown in FIG. 5, this cell operated for a total of 1320 hours at the identical utilizations used in the first cell. The higher cell performance decay rate in this cell is conjectured to be due to a loss of conductivity of the porous metal cathode electrode support. This conductivity loss can be alleviated by plating the Type 316 stainless steel porous metal cathode support or by using a different, more corrosion resistant or lower porosity porous metal. Nevertheless, the data clearly show the feasibility of lowering fuel cell package costs by eliminating both current collectors and substituting there for porous metal electrode supports in accordance with this invention.

Figure 2:
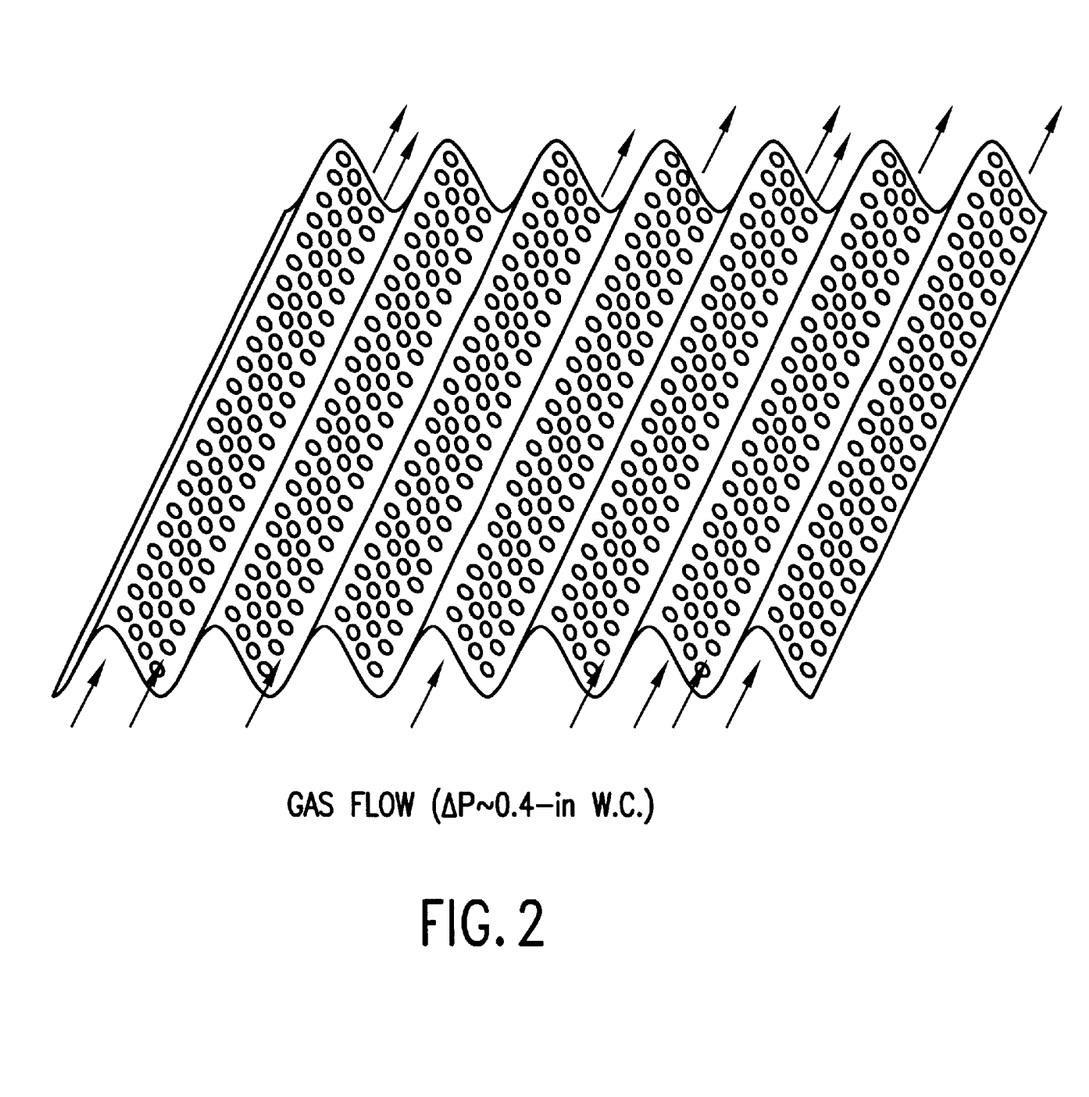
FIG. 2 is a diagram of a perforated/expanded metal corrugated electrode support and gas distributor in accordance with one embodiment of this invention.

FIG. 2 is a pictorial representation of a corrugated/perforated metal electrode support/gas distributor suitable for use in molten carbonate fuel cells in accordance with one embodiment of this invention. These supports, which replace the state-of-the-art anode and cathode current collectors of a molten carbonate fuel cell, are fabricated from perforated or expanded metal foils typically ranging in thickness from 0.005 inches to about 0.010 inches with hole sizes in the range of about 0.013 inches, providing an open area of at least 30% and preferably in the range of about 30–60%. The perforated or expanded metal foils are corrugated to give a ribbed configuration with a pitch and depth similar to those of the state-of-the-art ribbed separator plates currently used in conventional molten carbonate fuel cell stacks. Because of the thinness of the foils used to fabricate these types of supports, their weight is only a small fraction of the weight of the state-of-the-art nickel and fuel support plates/current collectors used in molten carbonate fuel cells.

The application of corrugated/perforated metal anode electrode supports has been demonstrated in two bench-scale sized molten carbonate fuel cells. Both cells were assembled using lithium/potassium carbonate electrolyte and a state-of-the-art electrolyte matrix. A state-of-the-art stainless steel current collector was used to support the cathode electrode in each test. The cells were operated solely with a fuel gas containing (by volume) 60% hydrogen, 20% carbon dioxide, and 20% steam, and oxidant gas containing 29% carbon dioxide, 68% air, and 2% steam, at 650° C. and atmospheric pressure.

Figure 6:
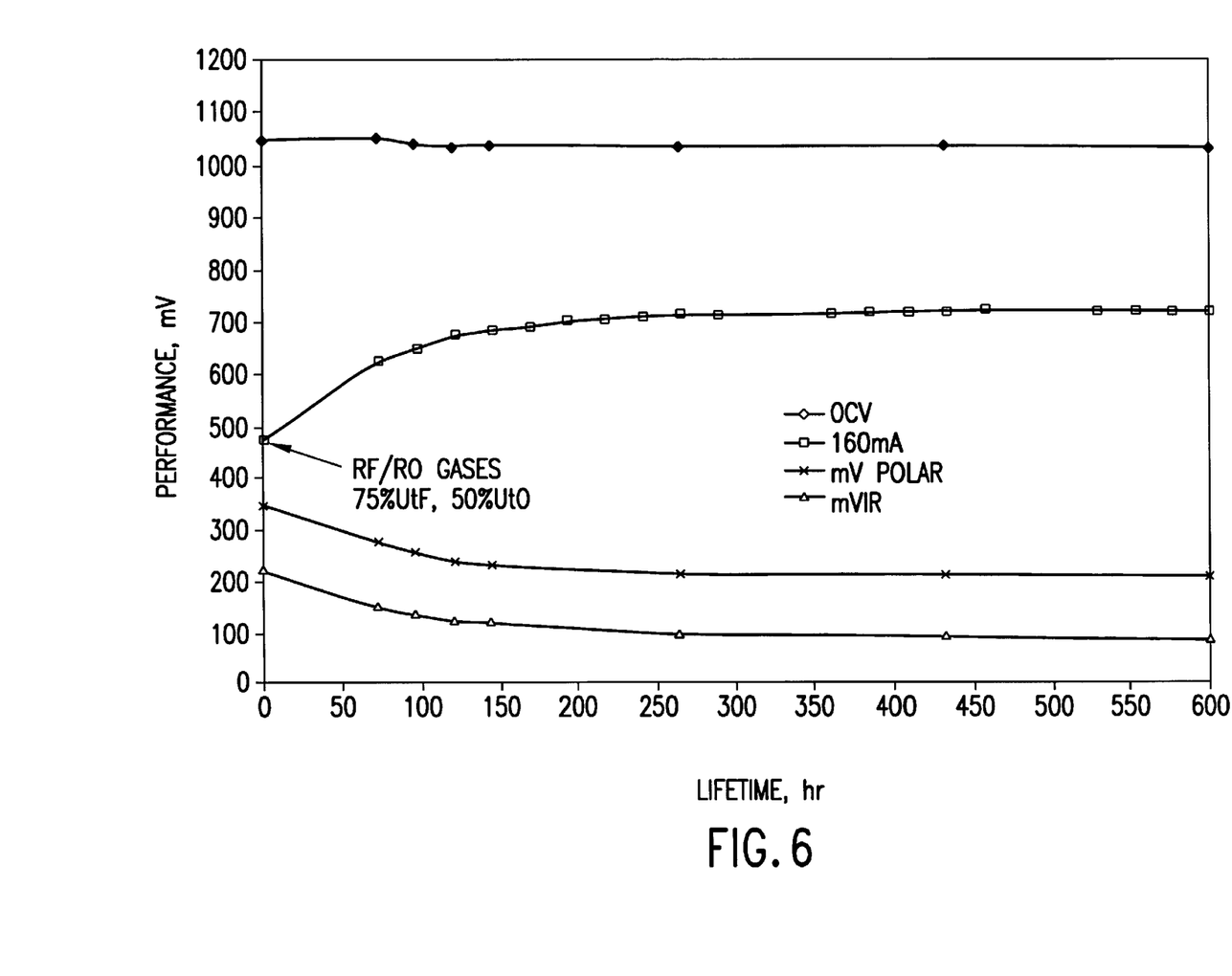
FIG. 6 is a diagram showing a life plot of a molten carbonate fuel cell test using corrugated/perforated metal foil anode electrode supports and gas distributors.

In the first cell test, a 4-inch square section of 0.005-inch thick corrugated/perforated 304 stainless steel foil with a rib-to-rib distance of 0.113 inches and a depth of 0.055 inches was substituted for the conventional flat perforated nickel sheet as anode current collector. As shown in FIG. 6, this cell demonstrated state-of-the-art performance for a total of 600 hours.

Figure 7:
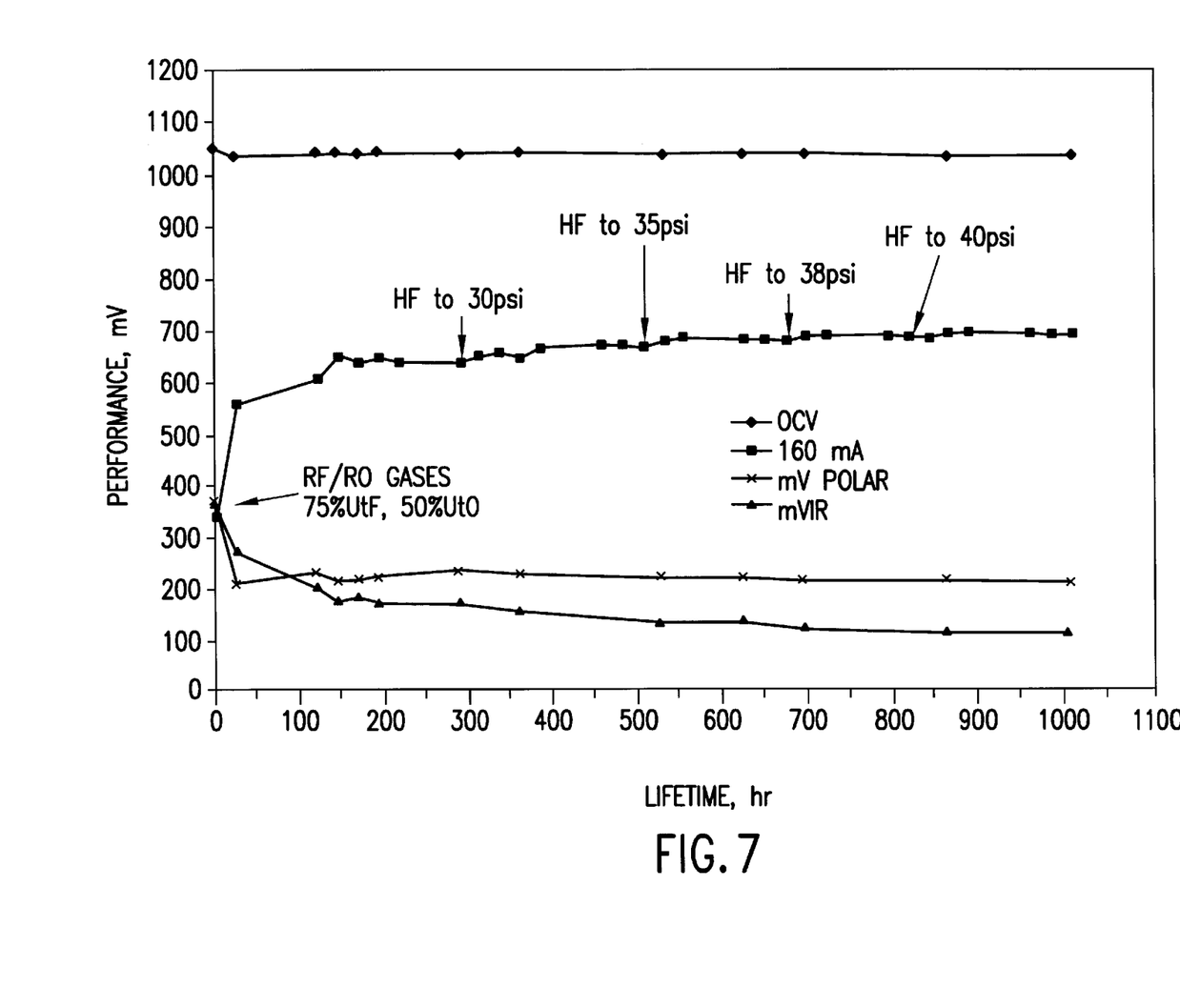
FIG. 7 is a diagram showing a life plot of a molten carbonate fuel cell test using corrugated expanded nickel metal foil anode electrode supports and gas distributors.

In the second cell test, a 4-inch square section of 0.010 inch thick corrugated expanded nickel metal with a rib-to-rib distance of 0.180 inches and a depth of 0.050 inches was substituted for the conventional flat perforated nickel sheet as anode current collector. As shown in FIG. 7, this cell demonstrated state-of-the-art performance for a period of 1008 hours.

Figure 3:
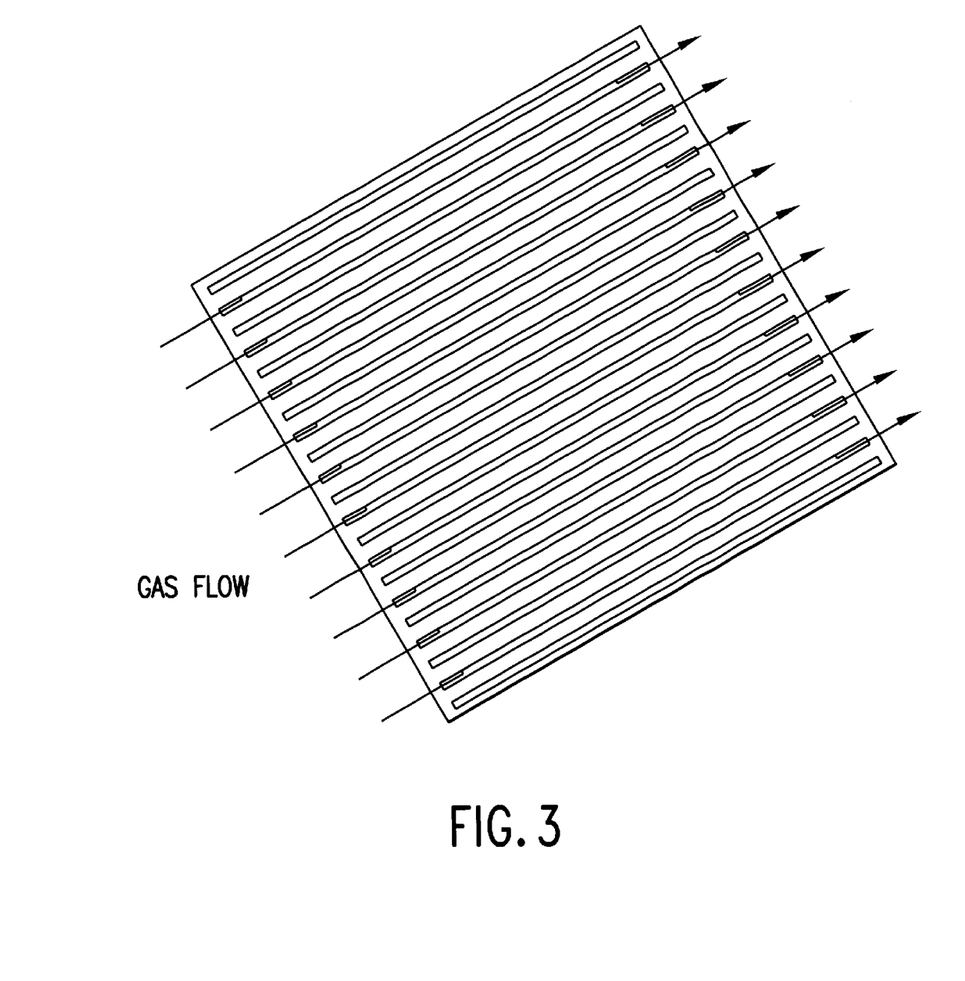
FIG. 3 is a diagram of a slotted metal electrode support and gas distributor in accordance with one embodiment of this invention.
Figure 8:
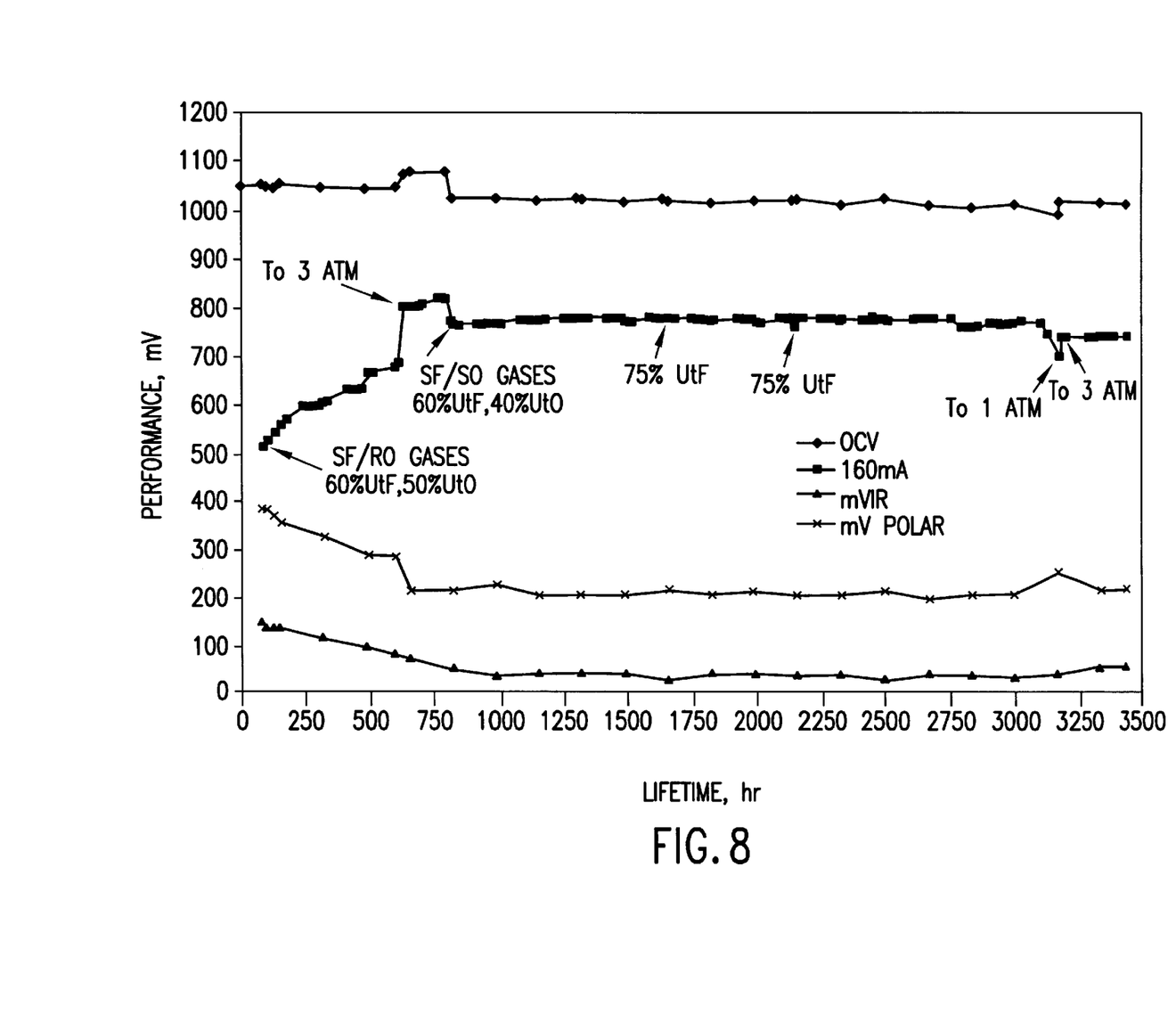
FIG. 8 is a diagram showing a life plot of a molten carbonate fuel cell test using slotted metal sheet anode electrode supports and gas distributors.
Figure 9:
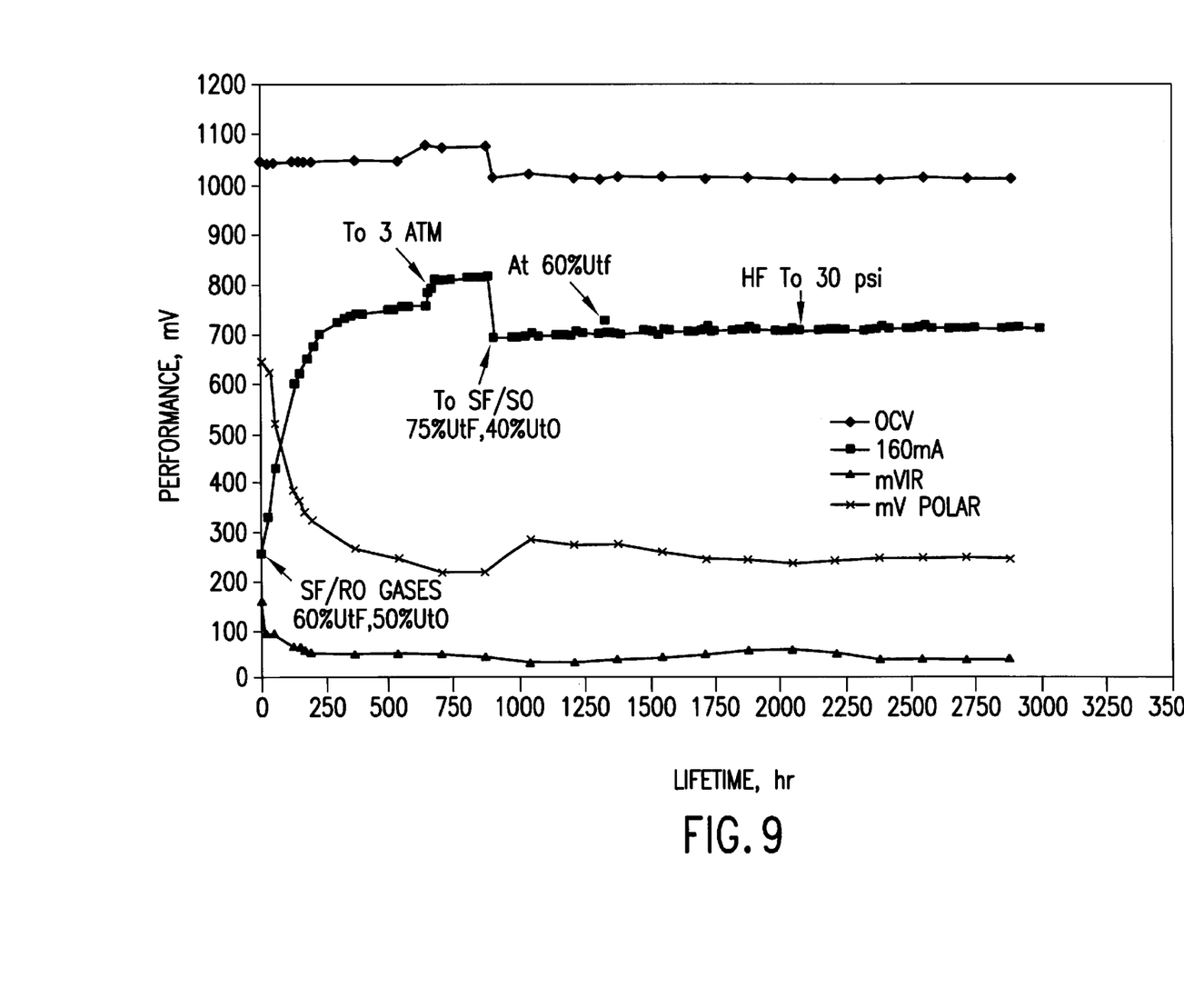
FIG. 9 is a diagram showing a life plot of a molten carbonate fuel cell test using slotted plated metal sheet anode electrode supports and gas distributors.

FIG. 3 is a pictorial representation of a slotted metal anode electrode support/gas distributor for a molten carbonate fuel cell in accordance with one embodiment of this invention. The application of a slotted metal anode electrode support/gas distributor as shown in FIG. 3 has been demonstrated in two bench-scale size molten carbonate fuel cells. The first cell was assembled using lithium/sodium carbonate electrolyte and the second cell was assembled using lithium potassium electrolyte, and both cells used a state-of-the-art stainless steel cathode current collector to support the cathode and state-of-the-art electrolyte matrices. Both cells were initially operated at 650° C. and atmospheric pressure after which the pressure was increased to 3 atmospheres. Both cells were operated with a fuel gas containing (by volume) 60% hydrogen, 15% carbon dioxide, and 25% steam throughout the life of the test. The oxidant gas at 1 atmosphere operating pressure contained 29.4% carbon dioxide, 54% nitrogen, 14.3% oxygen, and 2.3% steam, and at 3 atmospheres contained 8% carbon dioxide, 59% nitrogen, 8% oxygen, and 25% steam. As shown in FIGS. 8 and 9, the fuel and oxidant utilizations were different in the two cells. In the first cell test, a 4-inch square section of a 0.050 inch thick 310 stainless steel slotted metal support/gas distributor having a rib-to-rib spacing of 0.150 inches and a rib width of 0.036 inches was substituted for the conventional flat perforated nickel sheet as anode current collector. As shown in FIG. 8, this cell demonstrated state-of-the-art performance for a total of 3432 hours.

In the second cell test, a 310 stainless steel slotted metal support/gas distributor plated with a tri-layer coating of Ni, Ni—Pd, and Au (flash coat) for corrosion resistance was substituted for the conventional flat perforated nickel sheet as anode current collector. The dimensions of the slotted metal support were identical to those of the first test. As shown in FIG. 9, the cell operated for 2712 hours with state-of-the-art performance.

Figure 10:
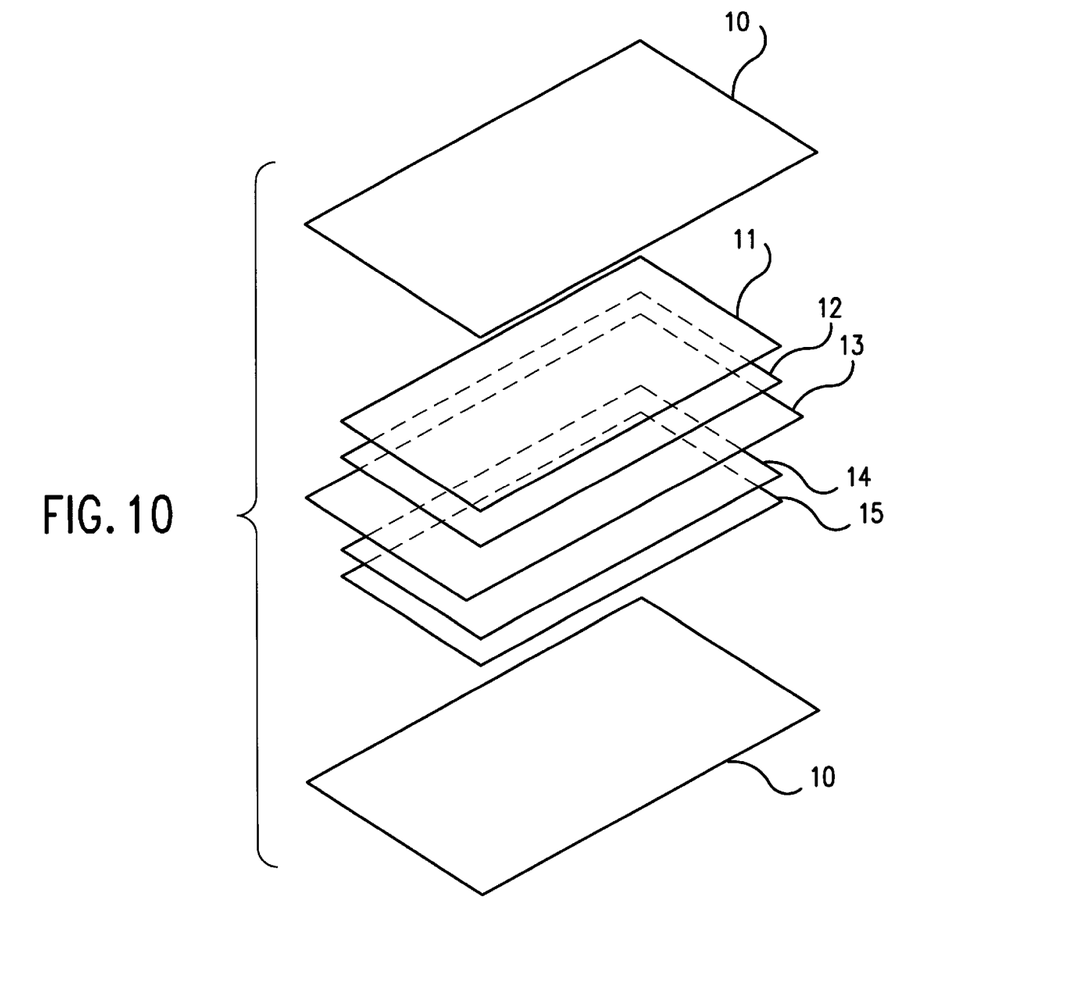
FIG. 10 is an exploded view of a portion of a fuel cell stack utilizing an electrode support/gas distributor in accordance with one embodiment of this invention.

FIG. 10 is an exploded view of a portion of a molten carbonate fuel cell stack employing flat porous foamed metal electrode supports in accordance with one embodiment of this invention. The fuel cell stack comprises electrolyte matrix 13 sandwiched between anode electrode 12 and cathode electrode 14. On the side of anode electrode 12 facing away from electrolyte matrix 13 is disposed anode electrode support 11. On the side of cathode electrode 14 facing away from electrolyte matrix 13 is disposed cathode electrode support/gas distributor 15. Flat separator plates 10 separate the fuel cell unit of electrolyte matrix 13, electrodes 12, 14, and electrode supports/gas distributors 11, 15 from adjacent fuel cell units. Because of the presence of the electrode supports in accordance with one embodiment of this invention, separator plates 10 are shown as flat plates, gas distribution to the fuel cell stack being provided through electrode supports/gas distributors 11 and 15.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. In a molten carbonate fuel cell comprising an anode electrode, a cathode electrode, and an electrolyte matrix disposed between said anode electrode and said cathode electrode, the improvement comprising:

an electrode support constructed of a high porosity reticulated foam material disposed on an electrode face of at least one of said anode electrode and said cathode electrode facing away from said electrolyte matrix and forming a plurality of pores, said high porosity reticulated foam material comprising one of a metal and a metal alloy selected from the group consisting of Type 316 stainless steel, Type 304 stainless steel, Type 316 Ti stainless steel, nickel-chromium, nickel-aluminum, copper, superalloys, oxide-dispersion-strengthened alloys and mixtures thereof;

a catalyst disposed within an interior of said high porosity reticulated foam material; and an electrolyte disposed within at least a portion of said plurality of pores, whereby at least a portion of said electrolyte flows into said electrolyte matrix during initial conditioning of said fuel cell.

2. A molten carbonate fuel cell in accordance with claim 1, wherein said high porosity reticulated foam material is fabricated from a reticulated/interconnected web precursor coated with one of a metal and a ceramic material which is heated to remove said reticulated/interconnected web precursor.

3. A molten carbonate fuel cell in accordance with claim 1, wherein said electrode support has a porosity in a range of about 15% to about 97%.

4. A molten carbonate fuel cell in accordance with claim 3, wherein said electrode has a porosity in a range of about 50% to about 97%.

5. A molten carbonate fuel cell in accordance with claim 1, wherein said electrode support comprises at least one density gradient.

6. A molten carbonate fuel cell in accordance with claim 1, wherein said electrode support is strengthened by at least one of solid metal wire, solid metal strips and ceramic fibers embedded in said high porosity reticulated foam material.

7. In a molten carbonate fuel cell stack having a plurality of fuel cell units, each said fuel cell unit comprising an anode electrode, a cathode electrode, and an electrolyte matrix disposed between said anode electrode and said cathode electrode, a separator plate having an anode electrode facing face and a cathode electrode facing face separating each said fuel cell unit between said anode electrode of one said fuel cell unit and said cathode electrode of an adjacent said fuel cell unit, the improvement comprising:

a porous electrode support disposed between said separator plate and at least one of said anode electrode and said cathode electrode, said electrode support providing gas distribution to said at least one of said anode electrode and said cathode electrode;

a catalyst disposed within said porous electrode support; and an electrolyte disposed within at least a portion of said plurality of pores, whereby at least a portion of said electrolyte flows into said electrolyte matrix during initial conditioning of said fuel cell.

8. A molten carbonate fuel cell stack in accordance with claim 7, wherein said separator plate is a flat sheet metal plate.

9. A molten carbonate fuel cell stack in accordance with claim 7, wherein said electrode support is constructed of a high porosity reticulated foam material.

10. A molten carbonate fuel cell stack in accordance with claim 9, wherein said high porosity reticulated foam material is fabricated from a reticulated/interconnected web precursor coated with one of a metal and a ceramic material which is heated to remove said reticulated/interconnected web precursor.

11. A molten carbonate fuel cell stack in accordance with claim 9, wherein said high porosity reticulated foam material comprises one of a metal and a metal alloy selected from the group consisting of nickel, Type 316 stainless-steel, Type 304 stainless-steel, Type 316 titanium stainless-steel, nickel-chromium, nickel-aluminum, copper, superalloys, oxide-dispersion-strengthened alloys and mixtures thereof.

12. A molten carbonate fuel cell stack in accordance with claim 9, wherein said electrode support has a porosity in a range of about 15% to about 97%.

13. A molten carbonate fuel cell stack in accordance with claim 9, wherein said electrode support comprises at least one density gradient.

* * * * *